April 9, 1957 B. F. ARPS 2,787,847
SCRAPER ATTACHMENT FOR TRACTORS
Filed Aug. 25, 1954 4 Sheets-Sheet 1
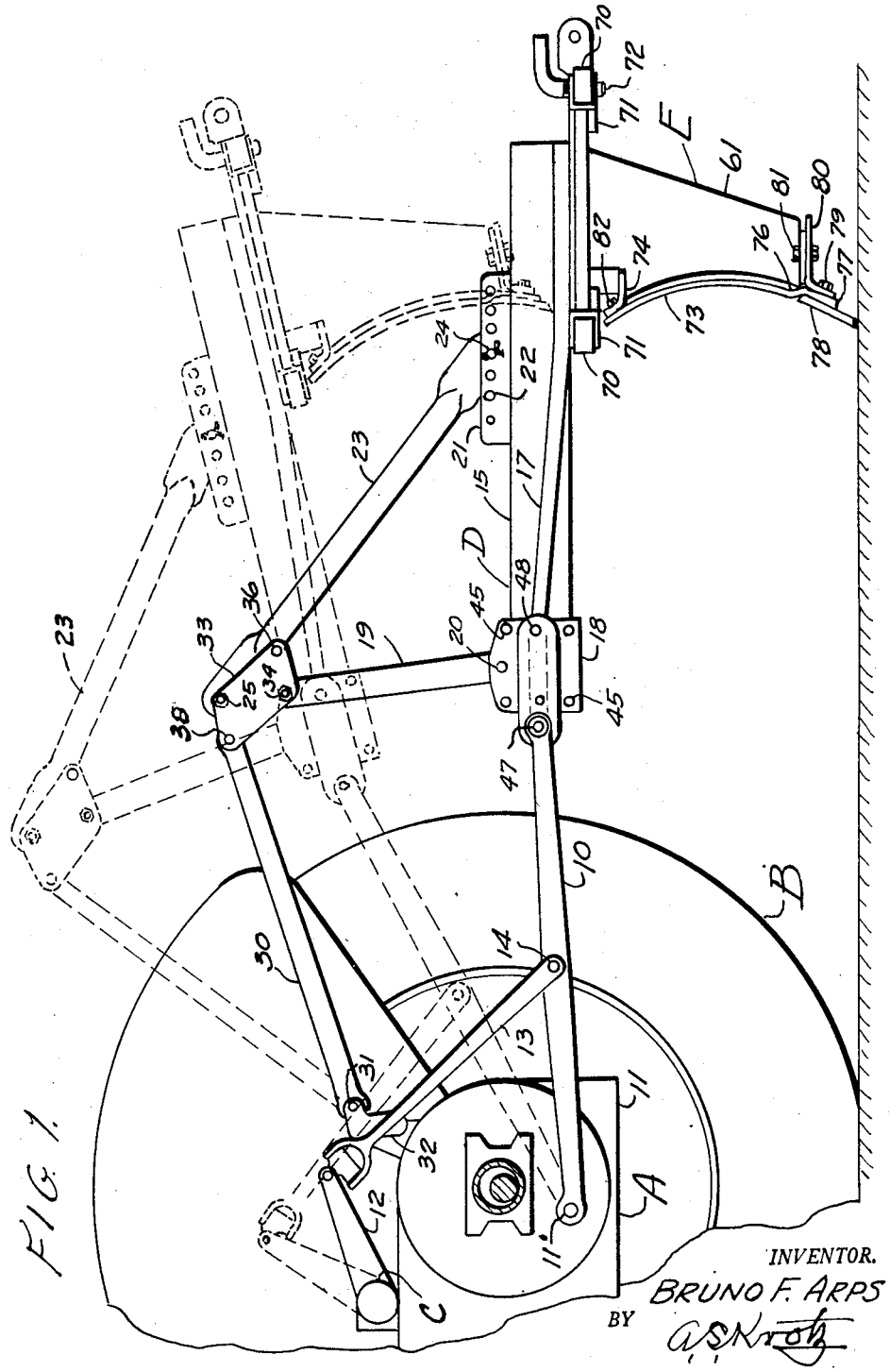

April 9, 1957 B. F. ARPS 2,787,847
SCRAPER ATTACHMENT FOR TRACTORS
Filed Aug. 25, 1954 4 Sheets-Sheet 2
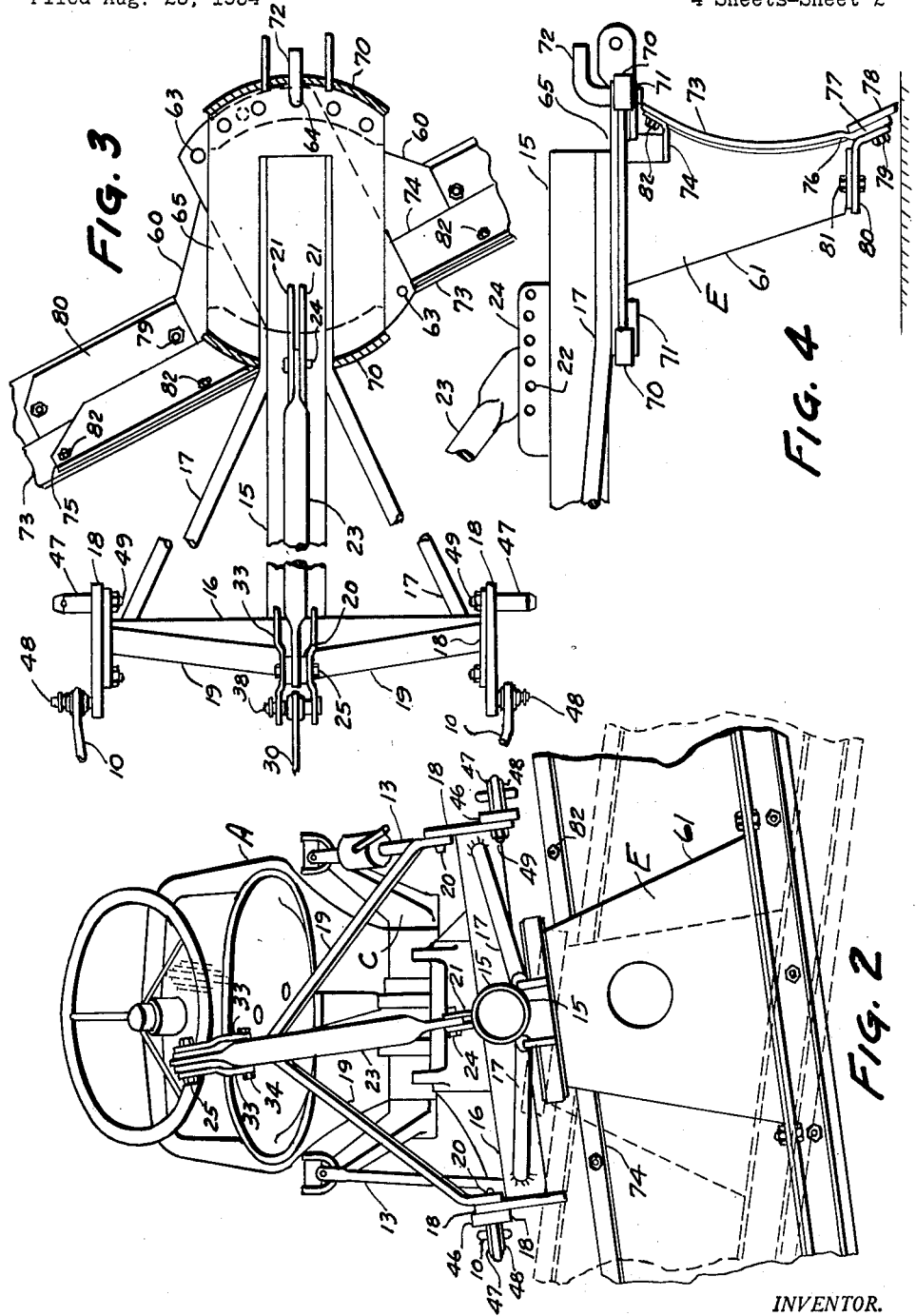
INVENTOR.
BRUNO F. ARPS
BY April 9, 1957 — B. F. ARPS — 2,787,847
SCRAPER ATTACHMENT FOR TRACTORS
Filed Aug. 25, 1954 — 4 Sheets-Sheet 3
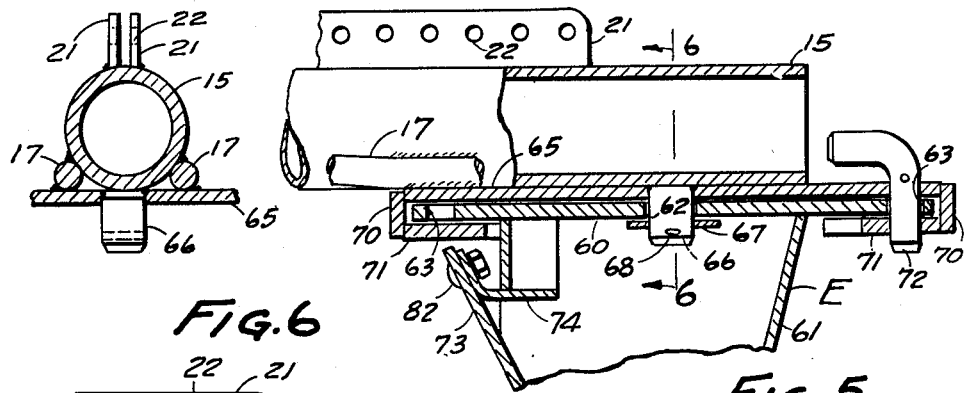
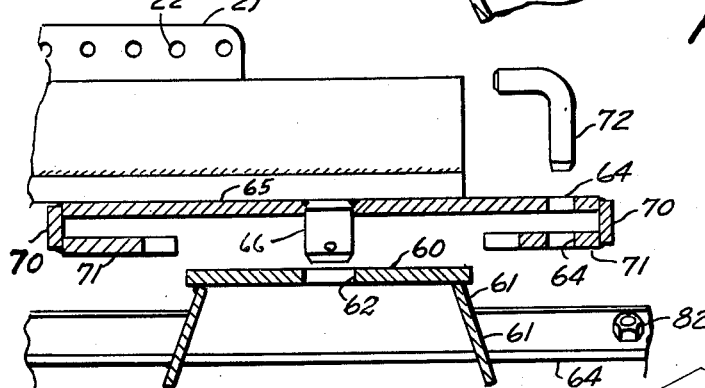
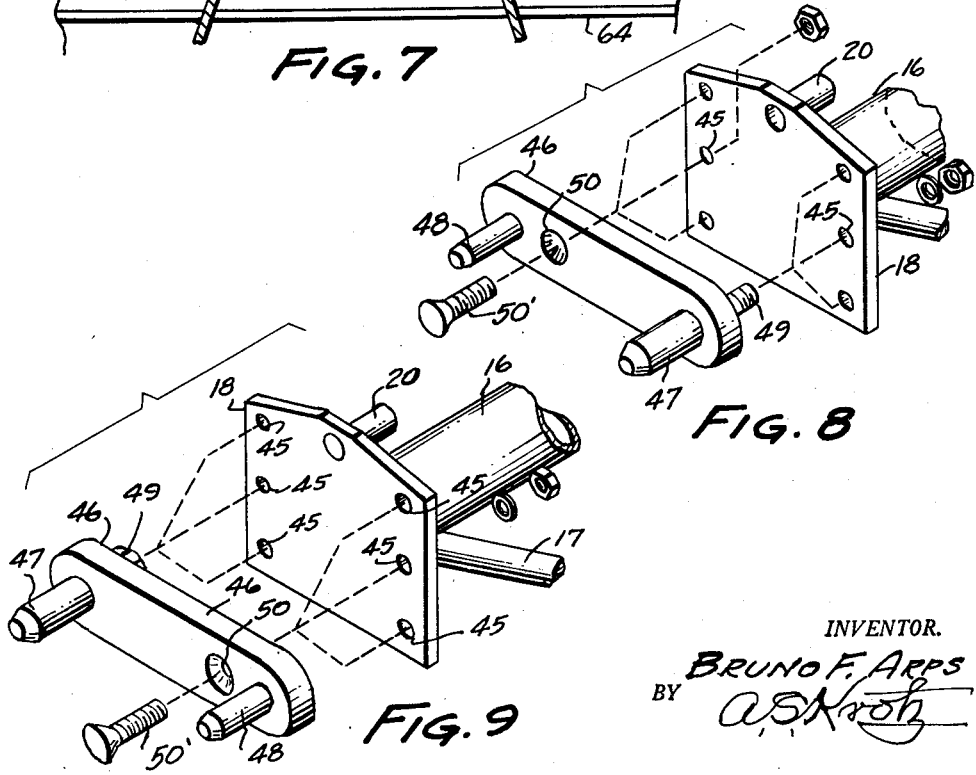
INVENTOR.
BRUNO F. ARPS
BY A. S. Kroh April 9, 1957 B. F. ARPS 2,787,847
SCRAPER ATTACHMENT FOR TRACTORS
Filed Aug. 25, 1954 4 Sheets-Sheet 4

INVENTOR.
BRUNO F. ARPS
BY *A. G. Krotz*

2,787,847

United States Patent Office

Patented Apr. 9, 1957

2,787,847

SCRAPER ATTACHMENT FOR TRACTORS

Bruno F. Arps, New Holstein, Wis., assignor to Arps Corporation, New Holstein, Wis.

Application August 25, 1954, Serial No. 452,093

3 Claims. (Cl. 37—159)

The present invention relates to a scraper attachment for tractors which was designed for maximum operating results with minimum labor, upkeep and cost.

This present invention is the result of many years experience in the manufacture and use of attachments of the class.

In road building and other uses for devices of the class, attachments must be strong and capable for continuous use under very serious conditions for obvious reasons. The present invention meets this situation successfully.

To these and other useful ends my invention consists of parts, combinations of parts or their equivalents and mode of operation as described and claimed and shown in the accompanying drawings in which:

Fig. 1 is a side elevational view of my invention and shown as attached to the rear end of a fractionally shown tractor.

Fig. 2 is a rear and fractional view of the device as shown in Figure 1.

Fig. 3 is a top fractional view as shown in Figure 1, wherein the rear ends only of the draw bars and stabilizing bar are shown.

Fig. 4 is a side elevational view of the scraper bracket shown as attached to the rear end of the scraper frame and in a reversed position for bulldozer operations.

Fig. 5 is a view similar to Figure 4 with the scraper bracket and its scraper blade shown fractionally and in position for conventional forward movement of the tractor.

Fig. 6 is a section of the device taken on line 6—6 of Figure 5.

Fig. 7 is an exploded view of the device shown in Figure 5 with the scraper bracket turned for removal from its holding means.

Figs. 8 and 9 are exploded views of a vertical adjusting means for attachment of member D to the rear end of the draw bars.

Figure 10:
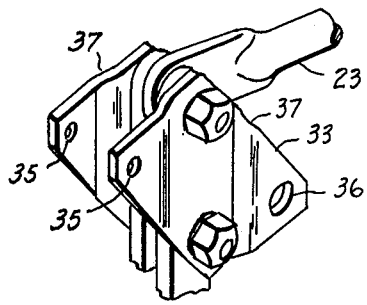
Figs. 10, 11, 12, 13, 14 and 15 are detailed perspective views of the use of special brackets as variously attached to the device.

As thus illustrated the fraction of a tractor is designated by reference character A and a fraction of the rubber tired tractor driving wheels is designated by reference character B. The power lift is conventional and is designated by reference character C. The scraper holding frame in its entirety is designated by reference character D and in the same manner the scraper bracket is designated by reference character E.

Conventional tractors are supplied with transversely spaced draw bars 10, which are transversely pivoted to the tractor frame 11 as at 11'. Member C is provided with transversely spaced arms 12—12, each are having a link connection 13 to which draw bars 10 are connected as at 14. Frame D preferably comprises a longitudinal tube 15 suitably secured at its front end to a transverse tube 16 having brace bars 17—17. Member 16 has secured to its ends plates 18—18.

Figure 13:
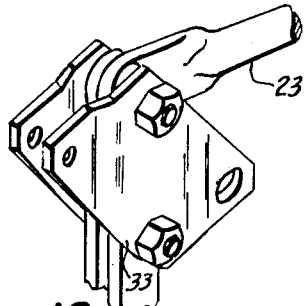
Figure 11:
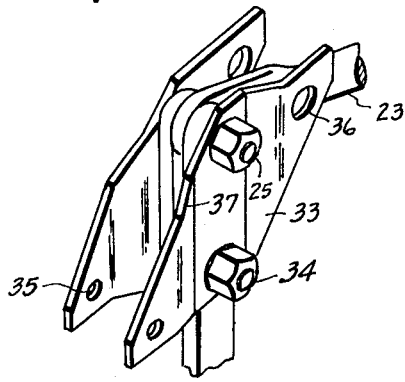
Figure 14:
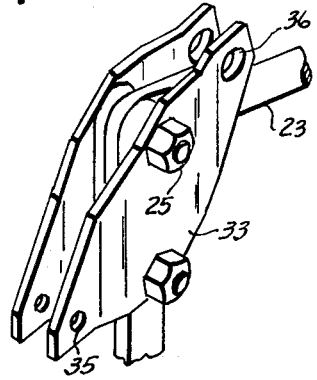
Figure 12:
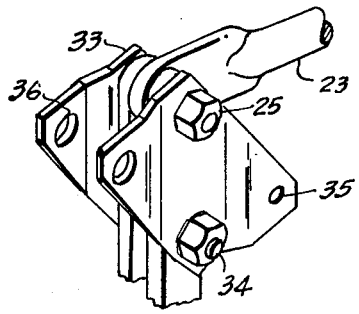
Figure 15:
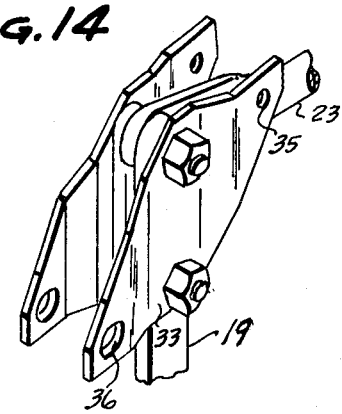

I provide a supplemental frame comprising two diverging bars 19—19 which are at their lower ends transversely pivoted to plates 18 as at 20—20 (see Figure 2), the upper ends of which are for a short distance closely spaced and parallel to each other as illustrated in Figures 10–15. The rear end of member 15 has secured thereto on its top surface spaced apart bars 21—21 having a number of spaced openings 22 (see Figures 4, 5 and 7).

A bar 23 is flattened at its rear end and adapted to lie between members 21 and be secured to any one of the openings 22 by means of a bolt or pin 24. Its front end also is flattened and is positioned between the upper ends of members 19 and held into position by means of a bolt 25 (see Figures 1 and 3). Thus the rear end of member 15 may be raised or lowered relative to member 16 by moving the connection of member 23 and bolt 24 to any one of openings 22.

I provide a stabilizing bar 30 which is at its front end pivoted as at 31 to a member 32 which is suitably mounted on frame 11 of the tractor.

I provide transversely positioned brackets 33—33 which are removably secured to the outside surface of members 19 by means of bolt 25 and another bolt 34. These brackets 33 are shaped as shown in Figures 10–15 having at one end relatively small openings 35 and at the other end relatively large openings 36 for the reception of tractor stabilizing and brace bars which may have different sized openings therein. Brackets 33 are offset as at 37 for a purpose which will hereinafter appear. One purpose of which is to form a connection for the rear end of member 30 (see Figure 3) by means of a suitable bolt or pin 38.

I will now describe the objects of member 18 and the parts connected thereto (see Figures 8 and 9). This member has on its front and rear edges preferably three or more spaced holes 45. Two plates 46—46 are adapted to be adjustably secured to member 18 as follows:

I mount two trunnions 47 and 48 of different diameters on opposite ends of members 46, one trunnion preferably member 47, having threaded projections 49 which are adapted to extend through any one of the openings 45. Member 46 has an opening 50 positioned whereby when member 49 extends through an opening 45 opening 50 will register with the opposite opening on plate 18 and be secured to this plate by means of a bolt 50' and a suitable nut and lock washer as shown.

Thus it will be seen that plates 46 may be secured to plates 18 in any one of three or more vertical positions, with trunnion 47 in a rearward or forward position; and that draw bars 10 at their rear ends may have openings for the free reception of trunnions 47 or 48. Thus member D may be connected to tractor A through draw bars 10 in various vertical positions relative to member 11. Furthermore member D may be tilted as illustrated in Figure 2 at three or more transverse angles as illustrated by full or dotted lines.

I will now describe member E and its connection to member 15. Referring specifically to Figures 5 and 6. I secure a plate 60 to the upper end of bracket 61 of member E, this plate having a central opening 62 and a number of spaced openings 63 on its front and rear ends which are on a radius with opening 62. I secure a plate 65 to frame tube 15 as illustrated in Figures 5 and 6 wherein members 17 extends to the rear end of member 15 and being welded to this member and member 65 as illustrated in Figure 6.

A trunnion 66 is secured to the center of member 65, (see Figures 5 and 6) and is adapted to extend freely through opening 62 in member 60. A washer 67 and preferably a cotter pin 68 are provided for holding plate 60 to plate 65 when member E is turned to a right angle for disengagement from plate 65 as illustrated in Figure 7 wherein it will be noted that member 60 is made narrow enough for this purpose.

Member 60 is held in working position on member 65 as follows: Sector plates 70—70 are secured to the front and rear ends of member 65 as illustrated. Two other sector plates 71—71 are secured to the lower edge of members 70 so member 60 is turnably held between members 65 and 71. Members 65 and 71 are provided with registering openings 64—64 on their rear ends which will also register with openings 63 for the free reception of a locking pin 72, whereby bracket E may be turned to any desired working position and locked by pin 72, for example as shown in Figures 3 and 4, or any intervening position as to transverse angle.

I mount a scraper blade 73 on member 61 as follows; the upper edge of member 73 is secured to bracket 61 by means of a transverse angle bar 74 and bolts 82 (see Figures 4, 5 and 6). Preferably each end bar 74 terminates as at 75 (see Figure 3), this bar being secured to member 61 in any suitable manner. Member 73 is offset at its bottom as at 76 forming a seat 77 to which a relatively narrow cutter blade 78 is attached by means of a number of bolts 79 which extend through a bracket 80 which is secured to member 61 by means of bolts 81. The member 61 and parts carried thereby may be changed from the position of Fig. 1 to the position of Fig. 4 for bulldozer operations.

Member 78 has tapered edges as illustrated in Figures 1 and 4, so these edges will register with offset 76.

Referring again to brackets 33; it will be noted that they may be secured to members 19 in six different positions as illustrated in Figures 10-15 whereby openings 35 and 36 may be variously positioned as illustrated. This is for the purpose of making adjustments for various tractor models, a description of which is not thought necessary.

Thus it will be seen that applicant has evolved a rugged and simple device easily manufactured at low cost and conveniently attached to various makes of tractors.

Having thus shown and described my invention, I claim:

1. In a scraper attachment for tractors having two transversely spaced draw bars hingedly secured at their front ends to the lower portion of the frame of the tractor, a power lift with an operating connection to said draw bars comprising, a scraper blade carrying frame having plates secured to its forward corners each having on its forward and rearward ends a number of vertically arranged spaced apart openings, brackets, each having an outwardly projecting trunnion at one end, each trunnion having a rearwardly extending threaded bolt, insertable through any one of said plate openings, an outwardly extending trunnion secured to the other end of each of said brackets, openings in said brackets for selective registration with said plate openings, said brackets being secured to said plates by means of bolts extending through the adjacent plate openings whereby said brackets may be turned end for end or be vertically positioned on said plates for transversely angling the scraper frame in relation to the front ends of said draw bars, and for connecting either pairs of trunnions to said draw bars.

2. A device as recited in claim 1 wherein said pairs of trunnions on the plates are of different diameters, whereby said brackets may be reversed for connection to the rear ends of draw bars, the latter being formed with corresponding different sized openings.

3. A scraper attachment for tractors having a pair of transversely spaced apart drawbars and a power lift operatively connected to each drawbar comprising, a scraper blade-carrying frame including a longitudinally extended main tube formed with a transverse tube at its front end, the rear ends of the drawbars being hingedly connected to the ends of said transverse member, a vertically extending supplemental frame transversely hinged at its lower portion to the ends of said transverse member, a stabilizing bar, means hingedly connecting the upper end portion of the supplemental frame to the rear end portion of the stabilizing bar, the front end portion of said stabilizing bar being hingedly connected to the rear end portion of the tractor frame spacedly over the front end portions of the drawbars, a brace bar connected to the upper end of the supplemental frame and to the main tube rearwardly of the front end thereof, a pair of plates removably secured to opposite sides of the upper ends of the vertically extending portion of the supplemental frame and having forwardly and rearwardly offset projections, each having an opening therein and each being secured to the upper end portion of the supplemental frame by bolts permitting reversal for varying the transverse distance between the projections and permitting said plates to be turned on said bolts for raising or lowering said openings to various vertical positions for adjusting the relative positions of said stabilizing bar and brace bar.

References Cited in the file of this patent

UNITED STATES PATENTS

| | | |
|---|---|---|
| 2,465,641 | Gardner | Mar. 29, 1949 |
| 2,503,929 | Washbond | Apr. 11, 1950 |
| 2,527,613 | Zagurski | Oct. 31, 1950 |
| 2,560,711 | Arps | July 17, 1951 |
| 2,564,355 | Danuser | Aug. 14, 1951 |
| 2,655,855 | Holder | Oct. 20, 1953 |